T. H. HART.
PERMUTATION LOCK.
APPLICATION FILED MAR. 24, 1911.

1,021,672.

Patented Mar. 26, 1912.

2 SHEETS—SHEET 1.

WITNESSES

INVENTOR
Thomas H. Hart
BY
ATTORNEYS

T. H. HART.
PERMUTATION LOCK.
APPLICATION FILED MAR. 24, 1911.

1,021,672. Patented Mar. 26, 1912.
2 SHEETS—SHEET 2.

WITNESSES:

INVENTOR
Thomas H. Hart
BY
ATTORNEYS

UNITED STATES PATENT OFFICE.

THOMAS HENRY HART, OF EVERETT, MASSACHUSETTS.

PERMUTATION-LOCK.

1,021,672.  Specification of Letters Patent.  Patented Mar. 26, 1912.

Application filed March 24, 1911. Serial No. 616,567.

*To all whom it may concern:*

Be it known that I, THOMAS HENRY HART, a subject of the King of Great Britain, and a resident of Everett, in the county of Middlesex and State of Massachusetts, have invented a new and Improved Permutation-Lock, of which the following is a full, clear, and exact description.

The object of the invention is to provide a new and improved permutation lock, arranged to permit the user having the combination to readily unlock the door on the outside without the use of a key, to prevent an unauthorized person from opening the lock, and to permit ready application of the device to door locks, as now generally used.

For the purpose mentioned, use is made of an outer hollow knob having a hub mounted to turn loosely on the spindle, a knob plate for attachment to the door, a notched disk on the said hub engaged by a click spring on the said knob plate, a series of tumblers, of which one is secured on the knob hub within the hollow knob and the others are loose on the spindle, and an arm attached to the spindle and carrying a dog for engagement with the tumblers.

A practical embodiment of the invention is represented in the accompanying drawings forming a part of this specification, in which similar characters of reference indicate corresponding parts in all the views.

Figure 1:
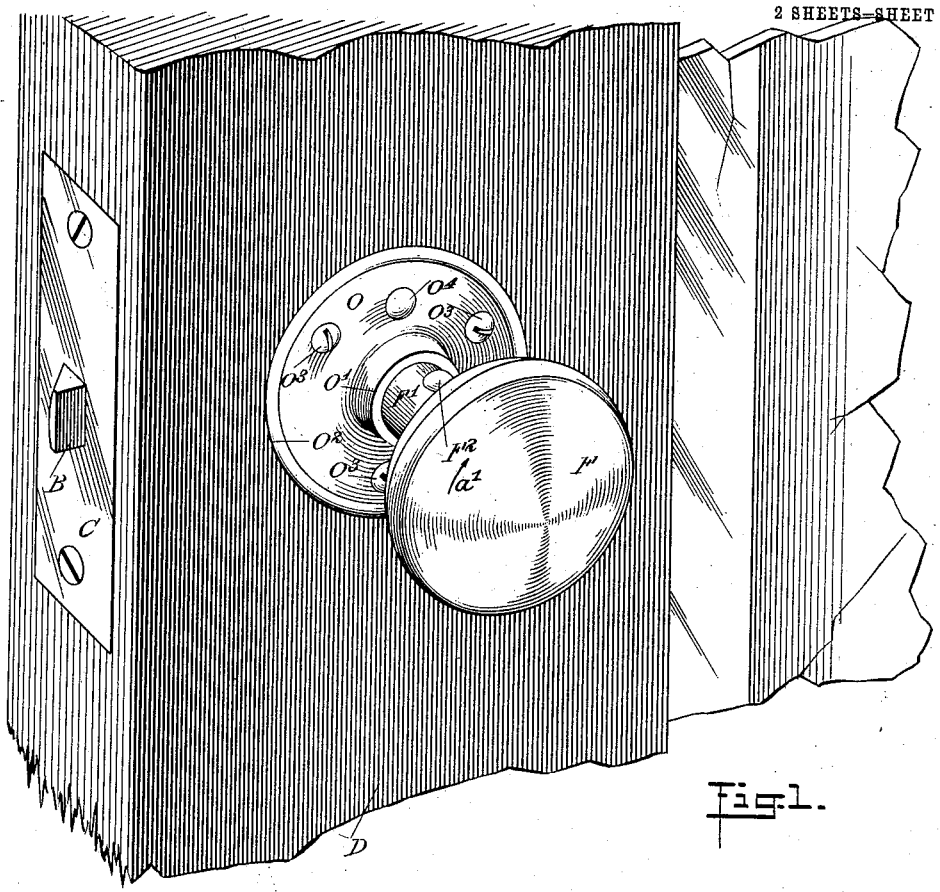
Figure 2:
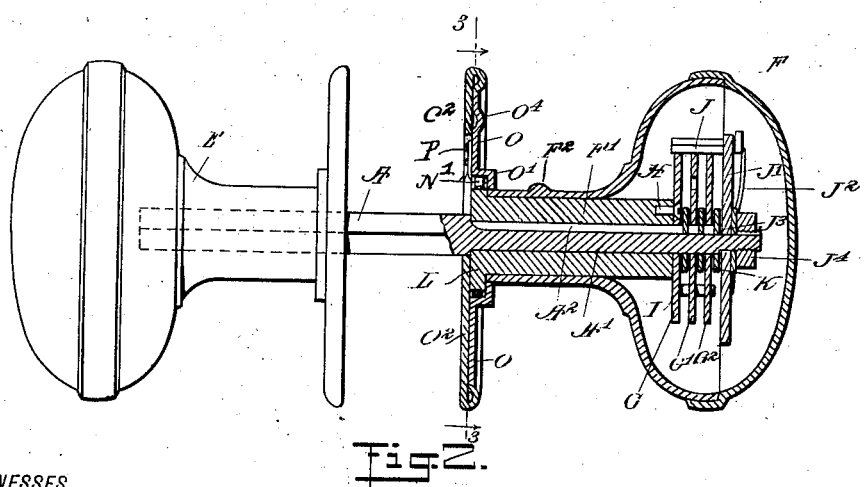
Figure 10:
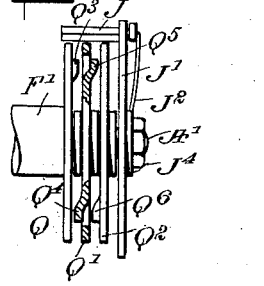
Figure 3:
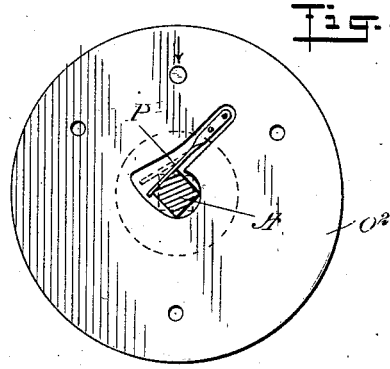
Figure 11:
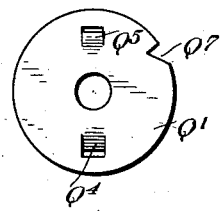
Figure 6:
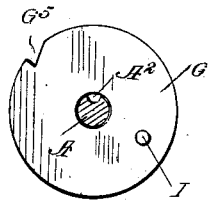
Figure 4:
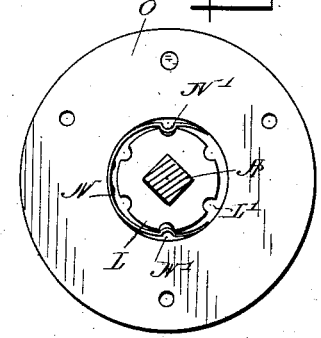
Figure 8:
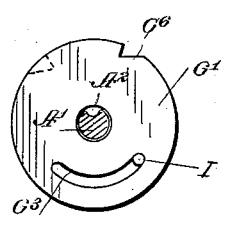
Figure 7:
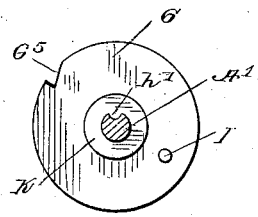
Figure 5:
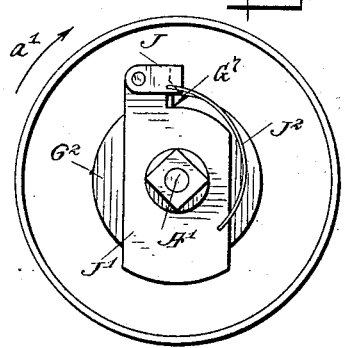
Figure 9:
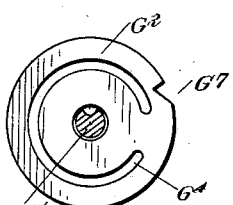

Figure 1 is a perspective view of the permutation lock as applied; Fig. 2 is a section of the spindle, the outer knob and the permutation device, the inner knob and the corresponding portion of the spindle being shown in elevation; Fig. 3 is a cross section of the same on the line 3—3 of Fig. 2; Fig. 4 is a rear face view of the outer section of the outer knob plate, the view illustrating the clicking device, and the spindle being shown in cross section; Fig. 5 is a front elevation of the outer door knob, part of which is removed to show the permutation device; Fig. 6 is a face view of the inner tumbler in position on the spindle, said spindle being shown in section; Fig. 7 is a like view of the same with the spacing washer in position; Fig. 8 is a like view of the second tumbler and the spindle in section; Fig. 9 is a like view of the third tumbler with the spindle in section; Fig. 10 is a side elevation of a set of tumblers of modified form as applied, one of the tumblers being shown in section; and Fig. 11 is a face view of one of the tumblers shown in Fig. 10.

The spindle A operates the latch bolt B of the door lock, and the latter is mounted in the lock casing C attached to the door D in the usual manner. On the inner polygonal portion of the spindle A is secured the inner door knob E, and the outer portion A' of the spindle A is made cylindrical, and on it is mounted to turn the hub F' of an outer door knob F made hollow, and preferably in two parts, soldered or otherwise fastened together, the said hollow outer door knob F accommodating the permutation device.

The permutation device consists of a plurality of disk tumblers G, G', $G^2$, mounted to turn loosely on the end A', and the tumbler G is fastened by a screw H or other suitable means to the outer end of the knob hub F', which latter for this purpose extends into the hollow portion of the knob F, as plainly indicated in Fig. 2. A pin I projects from the face of the tumbler G and extends through slots $G^3$, $G^4$ formed in the tumblers G' and $G^2$, and the said tumblers G, G' and $G^2$ are provided at their peripheral faces with notches $G^5$, $G^6$, $G^7$, adapted to be engaged when in transverse alinement with each other by a dog J pivoted on the free end of an arm J' and pressed by a spring $J^2$, the arm J' being secured on the outer end of the spindle portion A' so as to turn with the same. The tumblers G, G', $G^2$ are spaced from each other by washers K having lugs K' engaging a key-way $A^2$ formed lengthwise on the cylindrical end A' of the spindle A.

On the inner end of the hub F' of the outer door knob F is secured or formed a shoulder or disk L, provided in its peripheral face with spaced notches L' adapted to be engaged by lugs or teeth N' formed on the free ends of a spring N secured at its middle portion to a bearing O' formed on the outer section O of a knob plate, having an inner section $O^2$, the sections O, $O^2$ overlying one the other and being secured by screws $O^3$ to the door D. On the outer section O of the knob plate is formed an indicating point $O^4$ adapted to register with a corresponding indicating point $F^2$ formed on the inner portion or shank of the knob F, the said shank forming part of the hub F' of the said knob. When these indicating points register with each other, the parts are in proper position to begin the manipulation of the lock, according to the known combination, in order to open the door. On the back of the section O is secured a spring P bearing with its free end on a side of the polygonal portion of the spindle A, so as to hold the latter and the knob F in proper position when placing the knob F and the knob plate in position on the spindle. When the parts are assembled and the lock is in use then the outer knob F turns loosely on the cylindrical end A' of the spindle A and hence the latch bolt B cannot be withdrawn to open the door until the tumblers G, G' and G² are moved in such position that their notches G⁵, G⁶, G⁷ are in transverse alinement with each other and are engaged by the dog J. The user of the door lock, knowing the combination, which say is 5, 4, 2, turns the knob F until the point F² is in transverse alinement with the point O⁴, and then the user turns the knob F in the direction of the arrow $a'$ until he counts five clicks felt by the lugs N' engaging or snapping into a corresponding number of notches L' on the disk L turning with the knob F. The operator then turns the knob F in the inverse direction of the arrow $a'$ until four clicks are counted and then the knob F is turned again in the direction of the arrow $a'$ until two clicks are counted, so that now the notches G⁵, G⁶ and G⁷ are in register with each other and with the dog J so that the latter drops into the said notches, and when the operator now turns the knob F in the inverse direction of the arrow $a'$ the tumbler G carries the dog J along and with it the arm J', so that the spindle A is turned, as the arm J' is secured to the spindle, and consequently the latch bolt B is withdrawn from its keeper in the door casing to permit of opening the door.

It is understood that the tumblers G, G' and G² have their notches G⁵, G⁶ and G⁷ and the slots G³, G⁴ arranged according to the above combination, so that the operator on manipulating the knob F as described can unlock the door; but it is evident that the said tumblers can be differently arranged for different combinations without deviating from the spirit of my invention, and it is also evident that other means may be employed for turning the tumblers G' and G² from the tumbler G on turning the knob F; for instance, as shown in Figs. 10 and 11, in which three tumblers Q, Q' and Q² are employed, of which the tumbler Q is attached to the knob hub F' and is provided on its front face with a struck-up lug Q³ adapted to engage a similar lug Q⁴ on the rear face of the tumbler Q', and the latter is provided on its front face with a struck-up lug Q⁵ adapted to engage a struck-up lug Q⁶ on the rear face of the tumbler Q². The tumblers Q, Q' and Q² are provided with peripheral notches Q⁷ for the dog J to drop in as soon as the notches Q⁷ are in transverse alinement with each other opposite the dog J on turning the knob F according to the proper combination.

It is understood that in case an unauthorized person removes the screws O³ the knob F cannot be removed from the spindle A, as the arm J' carrying the dog J is rigidly secured to the outer end of the cylindrical portion A' of the spindle A, and consequently the unauthorized person cannot open the door. The arm J' is preferably provided with a lug J³ extending into the key-way A² of the spindle A, and a nut J⁴ is screwed on the outer terminal of the spindle end A' to hold the arm J' in place on the spindle a washer being interposed between the nut and the arm.

By providing the outer section O of the knob plate with a bearing O' the knob F is limited in movement in an axial direction owing to the shoulder or disk L fitting into the said bearing between the two sections O and O² forming the knob plate. Thus if the inside knob E should be removed from the spindle A the latter cannot be pulled out on pulling on the knob F and hence the lock remains operative from the outside without the knob E.

It will be noticed that the permutation device shown and described is very simple and durable in construction, and it can be readily attached to spindles A of door locks as now in use.

Having thus described my invention, I claim as new and desire to secure by Letters Patent:

1. A permutation door lock, comprising a spindle, an outer hollow knob having a hub, a knob plate for attachment to the door, a notched disk on the said hub, a click spring on the said knob plate and engaging the said notched disk, a series of tumblers, of which one is secured on the hub within the hollow knob and the others are loose on the spindle, and an arm attached to the spindle and carrying a dog for engagement with the tumblers.

2. A permutation door lock, comprising a spindle having a cylindrical portion, an outer hollow knob having a hub mounted to turn loosely on the said cylindrical portion, a notched disk on the inner end of the said knob hub, a series of tumblers within the hollow knob and of which one is secured to the outer end of the knob hub and the others are mounted to rotate loosely on the cylindrical spindle portion, an arm fixed on the end of the cylindrical spindle portion and provided with a spring-pressed dog engaging the said tumblers, a click spring engaging the said notched disk, and a knob plate for attachment to the door and having superimposed sections of which the outer one has a boss for engagement with the knob hub, the said click spring being attached to the said outer section of the knob plate.

3. A permutation door lock, comprising a spindle having a cylindrical portion, an outer hollow knob having a hub mounted to turn loosely on the said cylindrical portion, a notched disk on the inner end of the said knob hub, a series of tumblers within the hollow knob and of which one is secured to the outer end of the knob hub and the others are mounted to rotate loosely on the cylindrical spindle portion, an arm fixed on the end of the cylindrical spindle portion and provided with a spring-pressed dog engaging the said tumblers, a click spring engaging the said notched disk, a knob plate for attachment to the door and having superimposed sections of which the outer one has a boss for engagement with the knob hub, the said click spring being attached to the said outer section of the knob-plate, and indicating means on the said outer knob plate part and the knob hub.

4. A permutation door lock, comprising a spindle having a cylindrical portion, an outer hollow knob having a hub mounted to turn loosely on the said cylindrical portion, a notched disk on the inner end of the said knob hub, a series of tumblers within the hollow knob and of which one is secured to the outer end of the knob hub and the others are mounted to rotate loosely on the cylindrical spindle portion, an arm fixed on the end of the cylindrical spindle portion and provided with a spring-pressed dog engaging the said tumblers, a click spring engaging the said notched disk, a knob plate for attachment to the door and having superimposed sections of which the outer one has a boss for engagement with the knob hub, the said click spring being attached to the said outer section of the knob plate, and a spring on the inner knob plate part and engaging the polygonal portion of the spindle.

5. A door lock, provided with a spindle, a knob having a hub mounted to turn on the spindle, the said hub being provided with a disk having peripheral notches, permutation devices for connecting the hub with the spindle, a knob plate secured to the door and formed of two sections having a bearing for the said disk to turn in, and a click device attached to the said knob plate and engaging the said notched shoulder.

6. A permutation door lock, comprising a spindle, a hollow knob having a hub, a knob plate for attachment to the door, the said hub being provided at its inner end with a disk having peripheral notches, a click device carried by the knob plate for engaging the said notches, a series of tumblers within the hollow knob, one of said tumblers being secured to the hub and the others being loose on the hub, an arm secured on the spindle, and a spring-pressed dog pivoted on said arm and adapted to engage the said tumblers.

In testimony whereof I have signed my name to this specification in the presence of two subscribing witnesses.

THOMAS HENRY HART.

Witnesses:
   MAURICE J. FREEMAN,
   JOSEPH M. MURPHY.

---

Copies of this patent may be obtained for five cents each, by addressing the "Commissioner of Patents, Washington, D. C."